(12) United States Patent
Fujita

(10) Patent No.: US 9,085,197 B2
(45) Date of Patent: Jul. 21, 2015

(54) BICYCLE HUB KIT

(71) Applicant: Hiroshi Fujita, Osaka (JP)

(72) Inventor: Hiroshi Fujita, Osaka (JP)

(73) Assignee: Shimano Inc., Osaka (JP)

( * ) Notice: Subject to any disclaimer, the term of this patent is extended or adjusted under 35 U.S.C. 154(b) by 343 days.

(21) Appl. No.: 13/630,793

(22) Filed: Sep. 28, 2012

(65) Prior Publication Data

US 2014/0091614 A1    Apr. 3, 2014

(51) Int. Cl.
| | |
|---|---|
| *B60B 27/02* | (2006.01) |
| *B60B 35/18* | (2006.01) |
| *B62K 25/02* | (2006.01) |
| *B60B 27/00* | (2006.01) |

(52) U.S. Cl.
CPC ............ *B60B 27/02* (2013.01); *B60B 27/0078* (2013.01); *B60B 27/026* (2013.01); *B60B 35/18* (2013.01); *B62K 25/02* (2013.01); *B60B 2900/116* (2013.01); *B60B 2900/351* (2013.01)

(58) Field of Classification Search
CPC .... B60B 27/02; B60B 27/023; B60B 27/026; B60B 35/18; B60B 27/0078; B62K 25/02
USPC .......................................... 301/124.2, 110.5
See application file for complete search history.

(56) References Cited

U.S. PATENT DOCUMENTS

| | | | | |
|---|---|---|---|---|
| 5,383,716 | A * | 1/1995 | Stewart et al. ............... | 301/124.2 |
| 5,451,097 | A * | 9/1995 | Fu et al. ....................... | 301/110.6 |
| 5,518,096 | A * | 5/1996 | Lin .................................. | 192/64 |
| 5,823,555 | A * | 10/1998 | Ashman ......................... | 280/279 |
| 5,997,104 | A * | 12/1999 | Campagnolo ............... | 301/110.5 |
| 6,976,791 | B2 * | 12/2005 | Kanehisa et al. ............. | 384/545 |
| 7,186,030 | B2 * | 3/2007 | Schlanger ...................... | 384/545 |
| 7,191,884 | B2 * | 3/2007 | Kanehisa et al. ............... | 192/64 |
| 7,530,645 | B2 * | 5/2009 | Takachi ...................... | 301/124.2 |
| 7,556,321 | B2 * | 7/2009 | Hara et al. .................. | 301/124.2 |
| 7,581,795 | B1 * | 9/2009 | Chen .......................... | 301/110.5 |
| 7,766,143 | B1 * | 8/2010 | Chen .............................. | 192/64 |
| 7,909,412 | B2 * | 3/2011 | Ashman ..................... | 301/110.5 |
| 7,926,886 | B1 * | 4/2011 | Ashman ..................... | 301/110.5 |
| 2002/0149258 | A1 * | 10/2002 | Lew ........................... | 301/110.5 |
| 2005/0185872 | A1 * | 8/2005 | Kanehisa et al. ............. | 384/545 |
| 2008/0185907 | A1 * | 8/2008 | Hara et al. ................. | 301/111.03 |
| 2008/0211296 | A1 * | 9/2008 | Takachi ...................... | 301/124.2 |
| 2008/0315678 | A1 * | 12/2008 | Watarai ..................... | 301/110.5 |
| 2012/0007332 | A1 * | 1/2012 | Coombs .................... | 280/281.1 |

FOREIGN PATENT DOCUMENTS

| | | | | |
|---|---|---|---|---|
| DE | 202011101081 U1 * | 12/2011 | .......... | B60B 27/0052 |
| DE | 202011103153 U1 * | 12/2011 | ........... | B60B 27/026 |
| TW | 200528311 A | 9/2005 | | |

* cited by examiner

*Primary Examiner* — Kip T Kotter
*Assistant Examiner* — Scott A Browne
(74) *Attorney, Agent, or Firm* — Global IP Counselors

(57) ABSTRACT

A bicycle hub kit includes a hub axle, a hub shell, a bearing unit, first and second end nuts, and a retaining member. The bearing unit has a first ring, a second ring, and a plurality of rollers. The first and second end nuts are interchangeably coupled to an axle end of the hub axle. The retaining member retains an axial position of the first ring of the bearing unit with respect to the hub axle. The retaining member is disposed between the first ring of the bearing unit and one of the first and second end nuts. The first and second end nuts have first and second through holes, respectively. The second through hole of the second end nut has an inner diameter that is smaller than an inner diameter of the first through hole of the first end nut.

8 Claims, 4 Drawing Sheets

BICYCLE HUB KIT

BACKGROUND

1. Field of the Invention

This invention generally relates to a bicycle hub kit. More specifically, the present invention relates to a bicycle hub kit for a bicycle hub assembly.

2. Background Information

Conventionally, bicycle hub assemblies have a hub shaft or axle, a hub shell or body and a pair of bearing units. The hub axle is non-rotatably mounted to a frame of the bicycle (for example, to a front-fork). The hub body is coaxially coupled to the hub axle so that the hub body is disposed radially outwardly with respect to the hub axle. The bearing units are configured and arranged to support the hub body so that the hub body can freely rotate around the hub axle.

In the case of mountain bikes and other bicycles that travel on rough terrain, a hub axle with a large diameter is sometimes used to increase the rigidity of the bicycle hub assembly. On the other hand, some users of such bicycles prefer a quick release mechanism for removing and changing wheels. However, since the skewer shaft of a conventional quick release mechanism is typically small, the conventional quick release mechanism that a user wishes to use is incompatible with a large-diameter hub axle and cannot be installed in the large-diameter hub axle.

SUMMARY

One solution to this problem is to use a hub axle adapter inserted into the space between the large diameter hub axle and the skewer shaft of the conventional quick release mechanism. However, when this hub axle adapter is utilized, increase of the weight of the hub assembly is inevitable.

One object of the present disclosure is to provide a bicycle hub kit with which different spindles can be interchangeably accommodated without increasing the weight of a bicycle hub assembly.

In view of the state of the known technology, a bicycle hub kit includes a hub axle, a hub shell, a bearing unit, first and second end nuts, and a retaining member. The hub shell is rotatably supported to the hub axle. The bearing unit rotatably supports the hub shell relative to the hub axle. The bearing unit has a first ring that is coupled to the hub axle, a second ring that is coupled to the hub shell, and a plurality of rollers that is disposed between the first and second rings. The first and second end nuts are configured and arranged to be interchangeably coupled to an axle end of the hub axle. The retaining member is coupled to the first ring of the bearing unit and retaining an axial position of the first ring of the bearing unit with respect to the hub axle. The retaining member is disposed between the first ring of the bearing unit and one of the first and second end nuts. The first and second end nuts have first and second through holes, respectively. The second through hole of the second end nut has an inner diameter that is smaller than an inner diameter of the first through hole of the first end nut.

Other objects, features, aspects and advantages of the present disclosure will become apparent to those skilled in the art from the following detailed description, which, taken in conjunction with the annexed drawings, discloses a preferred embodiment of the bicycle hub kit.

BRIEF DESCRIPTION OF THE DRAWINGS

Referring now to the attached drawings which form a part of this original disclosure.

DETAILED DESCRIPTION OF EMBODIMENTS

A preferred embodiment will now be explained with reference to the drawings. It will be apparent to those skilled in the art from this disclosure that the following descriptions of the embodiment are provided for illustration only and not for the purpose of limiting the invention as defined by the appended claims and their equivalents.

Figure 1:
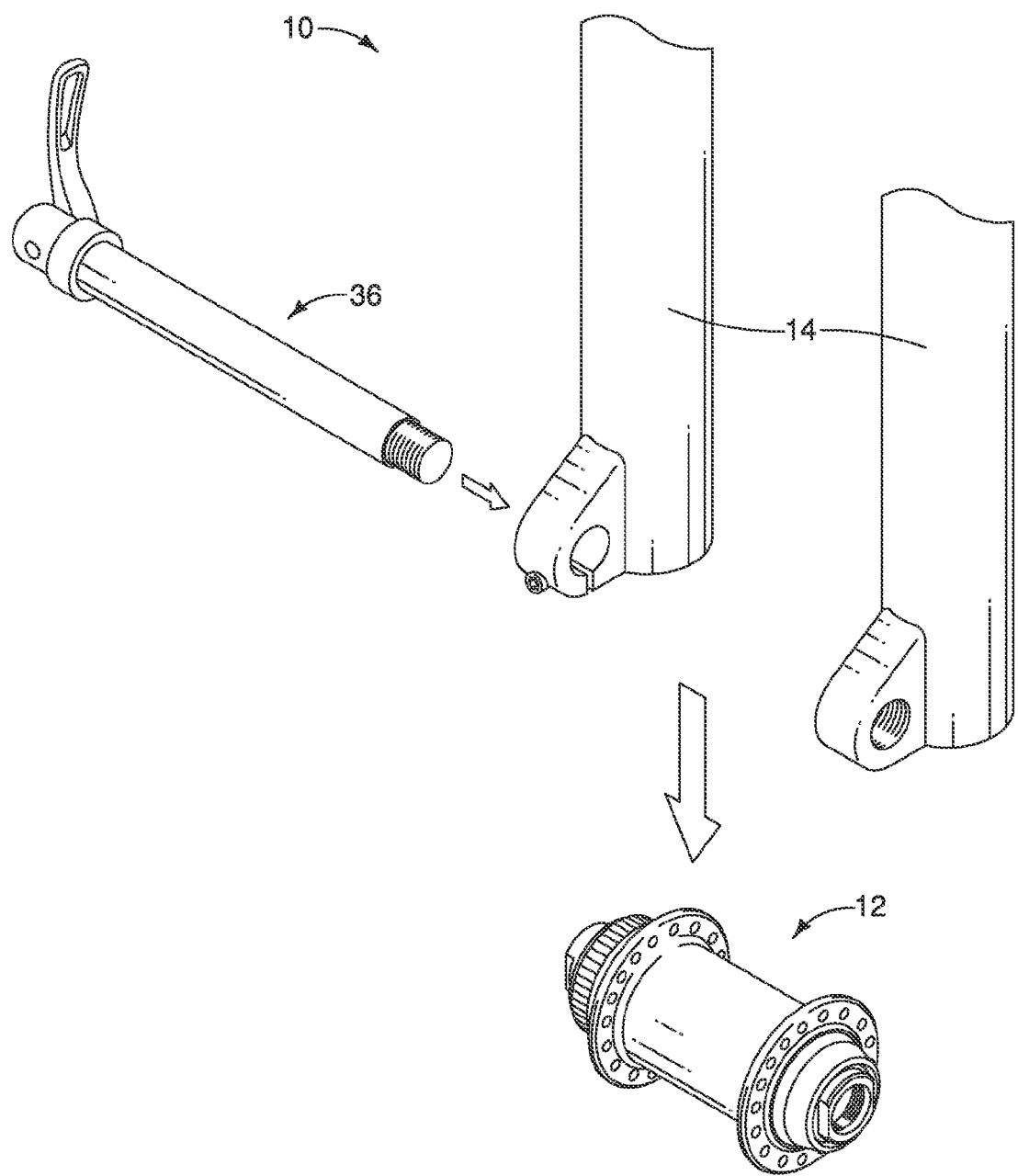
FIG. 1 is a partial perspective view of a bicycle frame of a bicycle that is equipped with a bicycle hub assembly as a thru axle hub in accordance with one embodiment.

Referring initially to FIG. 1, selected parts of a bicycle 10 is illustrated that is equipped with a bicycle hub assembly 12 in accordance with one embodiment. The bicycle hub assembly 12 is attached to a bicycle fork of a bicycle frame 14 in a conventional manner for rotatably supporting a wheel (not shown) relative to the bicycle frame 14. Since the selected parts of a bicycle 10 are well known in the art, the selected parts of a bicycle 10 will not be discussed or illustrated in detail herein, except for the parts that relate to the bicycle hub assembly 12. In other words, only the parts related to the bicycle hub assembly 12 will be discussed and illustrated in detail herein. Of course, it will be apparent from this disclosure that the arrangement of the bicycle hub assembly 12 can be applied not only to a front hub for rotatably supporting a front wheel (not shown), but also to a rear hub for rotatably supporting a rear wheel (not shown). Moreover, various conventional bicycle parts such as brakes, additional sprockets, derailleurs, etc., which may or may not be illustrated herein, can also be used in conjunction with the present disclosure.

Figure 2:
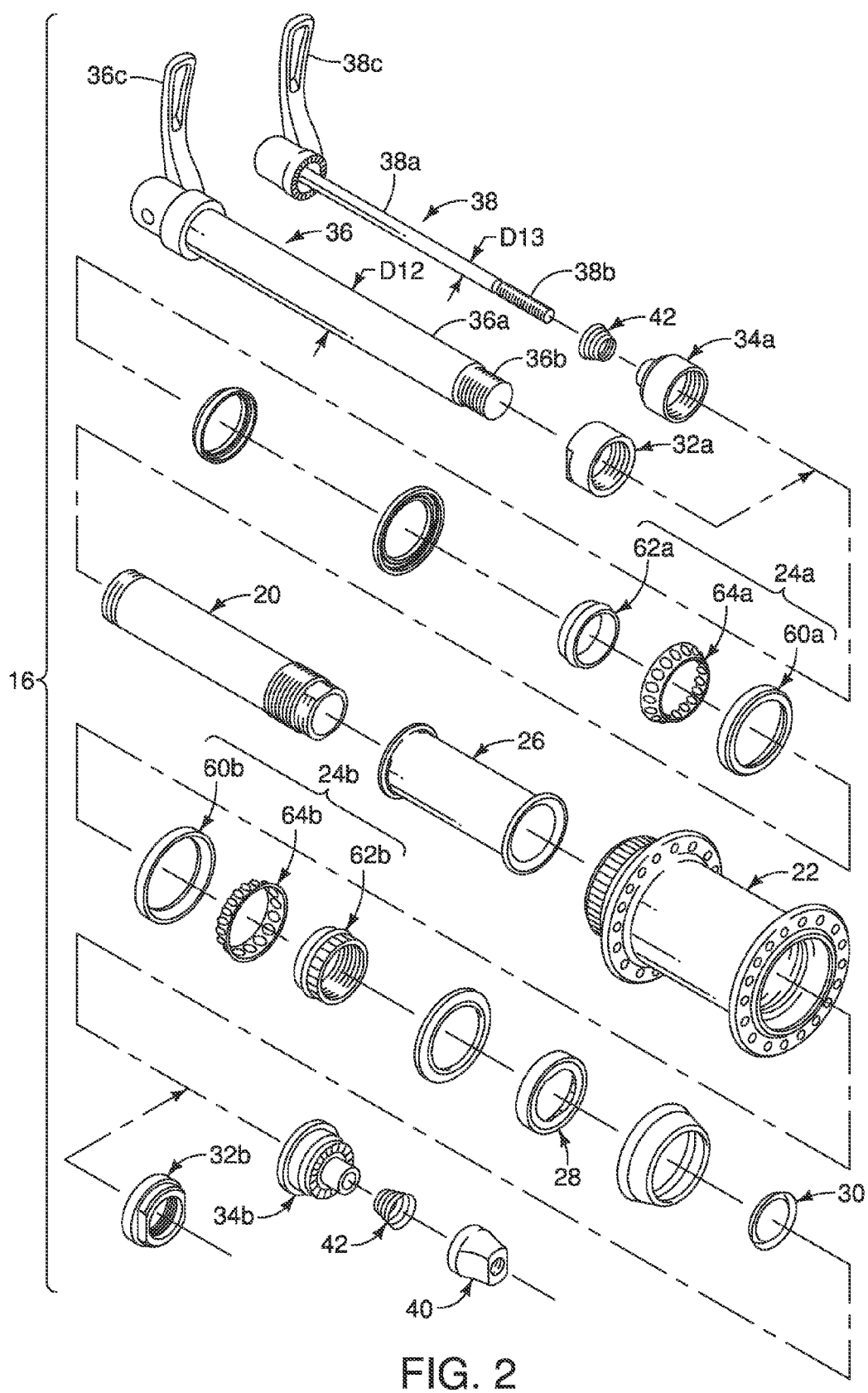
FIG. 2 is an exploded perspective view of parts of a bicycle hub kit, the bicycle hub kit interchangeably forming the bicycle hub assembly as a thru axle hub and as a quick release hub.
Figure 3:
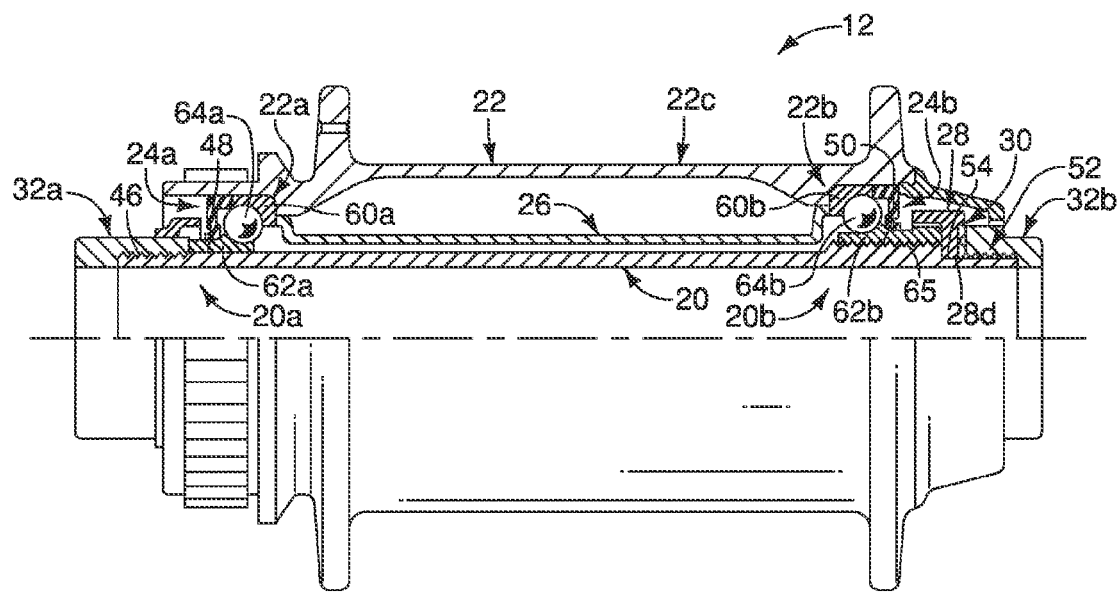
FIG. 3 is a partial cross sectional view of the bicycle hub assembly as a thru axle hub for accommodating a first spindle illustrated in FIG. 2.
Figure 4:
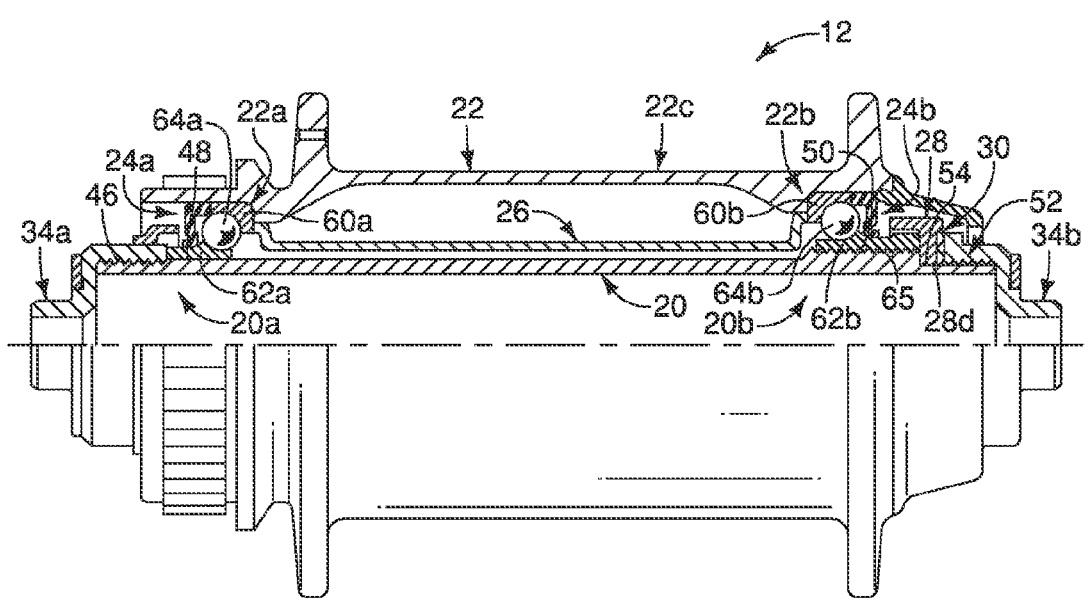
FIG. 4 is a partial cross sectional view of the bicycle hub assembly as a quick release hub for accommodating a second spindle illustrated in FIG. 2.

As shown in FIGS. 2 to 4, the bicycle hub assembly 12 is formed by selectively assembling parts of a bicycle hub kit 16. As best shown in FIG. 2, the bicycle hub kit 16 basically includes a hub shaft or axle 20, a hub body or shell 22, left and right bearings 24a and 24b (e.g., bearing units) and an inner tubular structure 26 for sealing grease applied to the left and right bearings 24a and 24b. The bicycle hub kit 16 also includes a retaining member 28 and an intermediate member 30. The bicycle hub kit 16 also includes left and right first end nuts 32a and 32b, and left and right second end nuts 34a and 34b. The bicycle hub kit 16 also includes a first spindle or skewer 36, a second spindle or skewer 38, an adjusting nut 40, and a pair of helical springs 42. The bicycle hub kit 16 also includes a pair of sealing rings for sealing end gaps between the hub body 22 and the left and right bearings 24a and 24b, respectively. Furthermore, the bicycle hub kit 16 also includes a cone with a dust cover. However, since these sealing rings and cone are conventional, the detailed descriptions thereof are omitted for the sake of brevity.

As shown in FIGS. 3 and 4, the bicycle hub assembly 12 is formed by selectively assembling parts of the bicycle hub kit 16. In particular, the left and right first end nuts 32a and 32b and the left and right second end nuts 34a and 34b are interchangeably and selectively utilized in the bicycle hub assembly 12 to interchangeably and selectively accommodate different spindles 36 and 38 in the bicycle hub assembly 12, respectively. Furthermore, the adjusting nut 40 and the helical springs 42 are additionally utilized in the bicycle hub assembly 12 while the left and right second end nuts 34a and 34b are utilized in the bicycle hub assembly 12 to accommodate the second spindle 38. On the other hand, parts of the bicycle hub kit 16 other than the left and right first end nuts 32a and 32b, the left and right second end nuts 34a and 34b, the adjusting nut 40 and the helical springs 42 can be commonly utilized in the bicycle hub assembly 12 regardless of the types of the spindles 36 and 38.

More specifically, as best shown in FIGS. 3 and 4, the bicycle hub assembly 12 commonly includes the hub axle 20, the hub body 22, the left and right bearings 24a and 24b, the inner tubular structure 26, the retaining member 28 and the intermediate member 30 regardless of the types of the spindles 36 and 38. The hub axle 20 is configured to be freely attachable to or detachable from the bicycle fork of the bicycle frame 14 (see FIG. 1) utilizing either the first spindle 36 or the second spindle 38. The hub body 22 is coaxially disposed radially outwardly with respect to the hub axle 20. The hub body 22 is rotatably supported to the hub axle 20. The left bearing 24a and the right bearing 24b are disposed between the hub axle 20 and the hub body 22 at axial end portions of the hub body 22 as seen in FIGS. 3 and 4. The left and right bearings 24a and 24b rotatably support the hub body 22 relative to the hub axle 20. The hub body 22 is freely rotatable on the hub axle 20 in both rotational directions about the hub axle 20.

Figure 6:
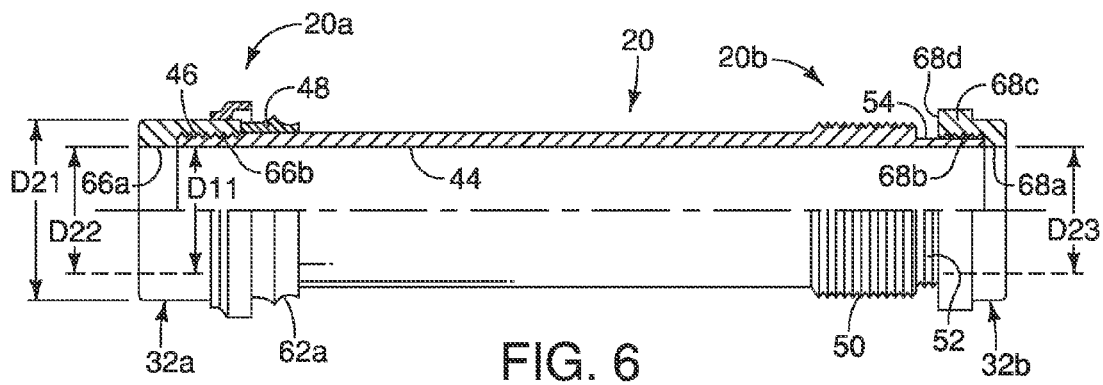
FIG. 6 is a partial cross sectional view of the hub axle of the bicycle hub assembly for accommodating the first spindle illustrated in FIG. 2.
Figure 7:
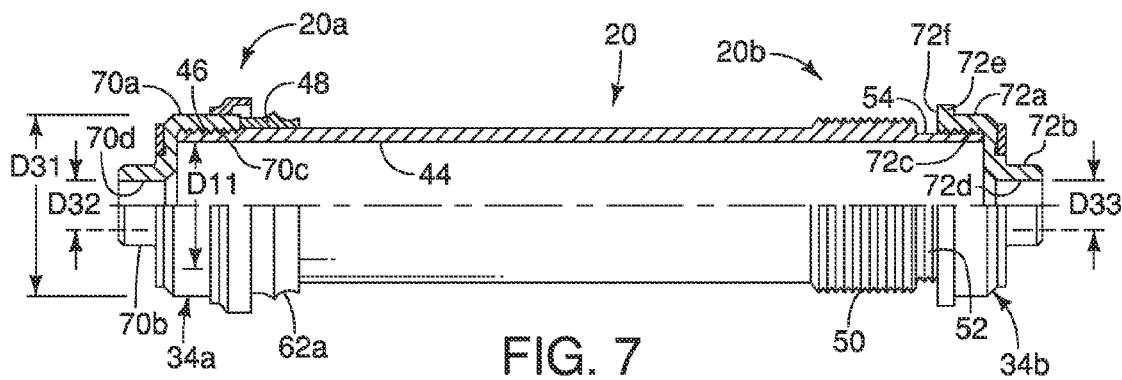
FIG. 7 is a partial cross sectional view of the hub axle of the bicycle hub assembly for accommodating the second spindle illustrated in FIG. 2.

As shown in FIGS. 3 and 4, the hub axle 20 has a generally tubular shape and is, for example, made of metal or any other suitable material. As best shown in FIGS. 6 and 7, the hub axle 20 has an inner cylindrical bore 44 with a constant inner diameter D11 along an axial direction of the hub axle 20. The inner diameter D11 of the hub axle 20 is substantially equal to an outer diameter D12 (e.g., a first diameter) of the first spindle 36 (see FIG. 2), and larger than an outer diameter D13 (e.g., a second diameter) of the second spindle 38 (see FIG. 2). In particular, the inner diameter D11 of the hub axle 20 is dimensioned such that the inner cylindrical bore 44 fittedly supports an outer peripheral surface of the first spindle 36 when the first spindle 36 is coupled to the hub axle 20.

As shown in FIGS. 3, 4, 6 and 7, the hub axle 20 has left and right end structures 20a and 20b on the left and right ends of the hub axle 20, respectively. The left end structure 20a has a left handed male or external screw section 46 (e.g., a threaded section) on the outer peripheral surface of the left end, and a non-threaded section 48 on the outer peripheral surface of the left end. The male screw section 46 is arranged to extend from a portion located outside of the portion to which the left bearing 24a is mounted toward the outward axial direction. The non-threaded section 48 is arranged to extend from a portion to which the male screw section 46 is provided toward the right end structure 20b. The non-threaded section 48 basically has a cylindrical peripheral surface that defines the outer peripheral surface of the hub axle 20. The right end structure 20b has a right handed male or external screw section 50 on the outer peripheral surface of the right end, and a right handed male or external screw section 52 (e.g., a threaded section) on the outer peripheral surface of the right end. The male screw section 50 is arranged to extend from a portion located slightly inside of the portion to which the right bearing 24b is mounted toward the outward axial direction. The male screw section 52 is arranged to extend from a portion located slightly outside of the portion to which the male screw section 50 is provided toward the outward axial direction. In the illustrated embodiment, the male screw section 50 has a larger diameter than the male screw section 52. The right end structure 20b further has a pair of mutually parallel chamfered sections 54 (e.g., retaining member attachment sections) along the male screw section 52 of the right end. The chamfered sections 54 are arranged outside of the portion to which the male screw section 50 is provided toward the outward axial direction. As best shown in FIGS. 6 and 7, the chamfered sections 54 have flat surfaces that extend parallel to a center axis of the hub axle 20, respectively. In other words, the chamfered sections 54 are formed on an outer peripheral face of the male screw section 52.

Figure 5:
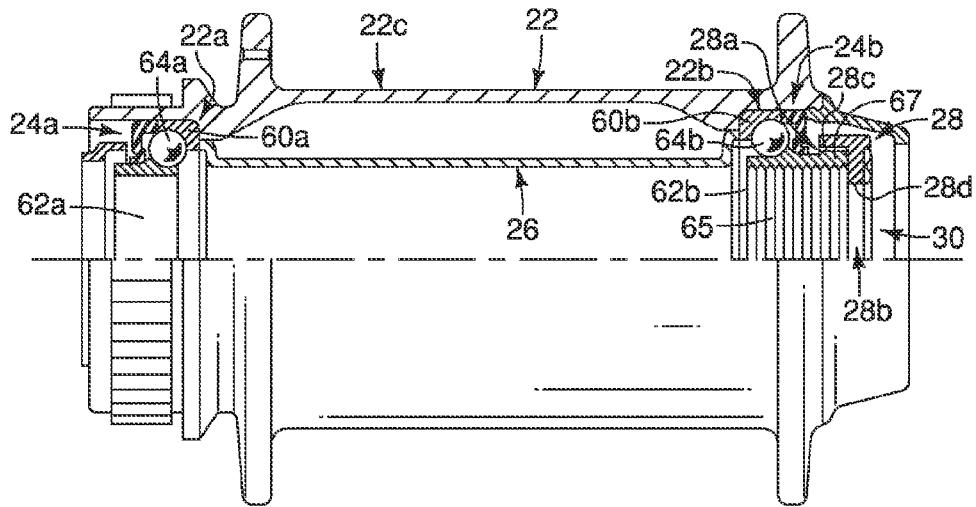
FIG. 5 is a partial cross sectional view of the bicycle hub assembly illustrated in FIGS. 3 and 4, a hub axle of the bicycle hub assembly removed from the bicycle hub assembly.

As shown in FIGS. 3 to 5, the hub body 22 has a generally tubular shape and is, for example, made of aluminum alloy. The hub body 22 includes a pair of hub flanges on the outer peripheral surface for attaching spokes thereto in conventional manner. The hub body 22 further includes an internal bore with a pair of bearing mounting sections 22a and 22b at each axial end portion for receiving the left and right bearings 24a and 24b, respectively, and a center tube section 22c extending therebetween. In particular, the left and right bearings 24a and 24b are fittedly mounted to the bearing mounting sections 22a and 22b, respectively.

As shown in FIGS. 3 to 5, the left bearing 24a basically includes a left outer ring or cup 60a, a left inner ring or cone 62a and a plurality of generally spherical rolling components 64a (only one rolling component 64a is shown in FIGS. 3 to 5). The left outer ring 60a of the left bearing 24a is pressed into and coupled to the bearing mounting section 22a of the hub body 22, which is formed on the inner perimeter in the axial end portion of the hub body 22. The left inner ring 62a of the left bearing 24a is press-fitted to the hub axle 20. Specifically, as best shown in FIGS. 6 and 7, the left inner ring 62a is pressed into and coupled to the non-threaded section 48 of the hub axle 20. The rolling components 64a are disposed between the left outer ring 60a and the left inner ring 62a. Similarly, as shown in FIGS. 3 to 5, the right bearing 24b basically includes a right outer ring or cup 60b (e.g., a second ring), a right inner ring 62b or cone (e.g., a first ring) and a plurality of generally spherical rolling components 64b (e.g., rollers) (only one rolling component 64b is shown in FIGS. 3 to 5). The right outer ring 60b of the right bearing 24b is pressed into and coupled to the bearing mounting section 22b of the hub body 22, which is formed on the inner perimeter in the axial end portion of the hub body 22. The right inner ring 62b of the right bearing 24b is threadedly coupled to the male screw section 50 of the hub axle 20. The right inner ring 62b of the right bearing 24b is axially adjustably coupled to the male screw section 50 of the hub axle 20. The rolling components 64b are disposed between the right outer ring 60b and the right inner ring 62b.

As shown in FIGS. 3 and 4, the left outer ring 60a includes a ball receiving surface (e.g., an outer bearing surface) that faces in a generally axial outward direction towards the first or left axle end of the hub axle 20. The left inner ring 62a includes a ball pushing surface (e.g., an inner bearing surface) that faces in a generally axial inward direction towards the second or right axle end of the hub axle 20. Likewise, as seen in FIGS. 3 and 4, the right outer ring 60b includes a ball receiving surface (e.g., an outer bearing surface) that faces in a generally axial outward direction towards the second or right axle end of the hub axle 20. The right inner ring 62b includes a ball pushing surface (e.g., an inner bearing surface) that faces in a generally axial inward direction towards the first or left axle end of the hub axle 20. Therefore, the left bearing 24a and the right bearing 24b are arranged as angular ball bearings, in which the load capacity relative to the thrust direction is greater. The left axial end of the inner tubular structure 26 contacts with an inner edge of the left outer ring 60a as shown in FIGS. 3 and 4, while the right axial end of the inner tubular structure 26 contacts with an inner edge of the right outer ring 60b as shown in FIGS. 3 and 4. The right inner ring 62b has an internal bore with female or internal threads 65 that are screwed into the male screw section 50 of the hub axle 20. The axial position of the right inner ring 62b relative to the hub axle 20 is adjusted by rotating the right inner ring 62b relative to the hub axle 20, thereby adjusting the bearing play of the left and right bearings 24a and 24b.

As shown in FIGS. 3 and 4, the retaining member 28 is mounted to the chamfered sections 54 of the hub axle 20. In particular, the retaining member 28 is non-rotatably and slidably engaged with the right inner ring 62b of the right bearing 24b. The axial position of the right inner ring 62b relative to the hub axle 20 is locked or retained by the retaining member 28. Furthermore, as shown in FIGS. 3 and 4, the retaining member 28 is disposed between the right inner ring 62b of the right bearing 24b and one of the right first end nut 32b and the right second end nut 34b.

The retaining member 28 is made of non-metallic material. In particular, the retaining member 28 is made of a resin, such as a carbon fiber reinforced resin. Of course, the retaining member 28 can be made of any other suitable materials such as a hard plastic resin or a metallic material. The retaining member 28 is a one-piece, unitary member. As best shown in FIG. 5, the retaining member 28 has first and second inner peripheral surfaces 28a and 28b. The second inner peripheral surface 28b is smaller in diameter than the first inner peripheral surface 28a. The retaining member 28 also has a plurality of internal splines 28c on the first inner peripheral surface 28a. The internal splines 28c of the retaining member 28 mesh with a plurality of external splines 67 of the right inner ring 62b of the right bearing 24b, thereby non-rotatably and slidably coupling the retaining member 28 with the right inner ring 62b of the right bearing 24b. The second inner peripheral surface 28b is configured such that the male screw section 52 and the chamfered sections 54 of the hub axle 20 extend through a bore defined by the second inner peripheral surface 28b of the retaining member 28. Specifically, the second inner peripheral surface 28b has a pair of flat parts 28d (only one of the flat parts 28d is shown in FIG. 5). As shown in FIGS. 3 and 4, the flat parts 28d radially face with the flat surfaces of the chamfered sections 54, respectively. Thus, the retaining member 28 is slidably and non-rotatably mounted to the chamfered sections 54 of the hub axle 20.

Furthermore, the retaining member 28 has an axial inward face that axially contacts with an axial end face of the right inner ring 62b of the right bearing 24b. The axial movement of the retaining member 28 relative to the hub axle 20 towards the left end of the hub axle 20 is restricted by an axial end face of the right inner ring 62b of the right bearing 24b. Since the right inner ring 62b is threadedly coupled to the hub axle 20, the axial position of the right inner ring 62b relative to the hub axle 20 is locked while the right inner ring 62b is non-rotatably coupled to the hub axle 20. Since the retaining member 28 is non-rotatably engaged with the hub axle 20 and the right inner ring 62b, the right inner ring 62b is also non-rotatably engaged with the hub axle 20, thereby the axial position of the right inner ring 62b relative to the hub axle 20 is locked. In the illustrated embodiment, the right inner ring 62b and the retaining member 28 axially contact with each other. However, the right inner ring 62b and the retaining member 28 can be configured such that the axial end face of the right inner ring 62b and axial inward face of the retaining member 28 do not axially contact with each other. Since the retaining member 28 is non-rotatably engaged with the hub axle 20 and the right inner ring 62b, the axial position of the right inner ring 62b relative to the hub axle 20 can be locked by the retaining member 28 even though the right inner ring 62b does not axially contact with the retaining member 28.

As shown in FIGS. 3 and 4, the intermediate member 30 is disposed between the retaining member 28 and one of the right first end nut 32b and the right second end nut 34b such that the intermediate member 30 directly contacts with the retaining member 28 and one of the right first end nut 321 and the right second end nut 34b.

The intermediate member 30 is basically a biasing member, such as a spring washer. In particular, in the illustrated embodiment, the intermediate member 30 is a wave washer. However, the intermediate member 30 can be different types of biasing members. The intermediate member 30 is made of non-metallic material, such as a rubber. The intermediate member 30 can be made of any suitable material as desired or needed. In particular, the intermediate member 30 can be made of metallic material. The intermediate member 30 is sandwiched between an axial outward face of the retaining member 28 and an axially facing surface of one of the right first end nut 32b and the right second end nut 34b. The intermediate member 30 has an axial overall thickness that is larger than the axial dimension of an axial spacing defined between the axial outward face of the retaining member 28 and the axially facing surface of one of the right first end nut 32b and the right second end nut 34b while the intermediate member 30 is in an unloaded state. On the other hand, the intermediate member 30 is compressed between the axial outward face of the retaining member 28 and the axially facing surface of one of the right first end nut 32b and the right second end nut 34b while the intermediate member 30 is disposed between the axial outward face of the retaining member 28 and the axially facing surface of one of the right first end nut 32b and the right second end nut 34b, and one of the right first end nut 32b and the right second end nut 34b is fully tightened to the hub axle 20. The intermediate member 30 axially biases the retaining member 28 and one of the right first end nut 32b and the right second end nut 34b away from each other while the intermediate member 30 is in a loaded state. In particular, the intermediate member 30 axially biases the retaining member 28 in the inward axial direction such that the axial inward face of the retaining member 28 is pressed against the axial end face of the right inner ring 62b that is threadedly coupled to the hub axle 20. Thus, the axial position of the retaining member 28 relative to the hub axle 20 is retained by the biasing force of the intermediate member 30. Furthermore, the intermediate member 30 axially biases one of the right first end nut 32b and the right second end nut 34b in the outward axial direction. Thus, the thread connection between the hub axle 20 and one of the right first end nut 32b and the right second end nut 34b is retained without loose by the biasing force of the intermediate member 30.

In the illustrated embodiment, the left and right end structures of the bicycle hub assembly 12 are different from each other. Specifically, the left end structure of the bicycle hub assembly 12 that is formed by the left end structure 20a of the hub axle 20 and the left bearing 24a is different from the right end structure of the bicycle hub assembly 12 that is formed by the right end structure 20b of the hub axle 20, the right bearing 24b, the retaining member 28, and the intermediate member 30. Alternatively or additionally, the left end structure of the bicycle hub assembly 12 can be applied to the right end structure of the bicycle hub assembly 12. Furthermore, the right end structure of the bicycle hub assembly 12 can be applied to the left end structure of the bicycle hub assembly 12.

As shown in FIGS. 3, 4, 6 and 7, the left and right first end nuts 32a and 32b and the left and right second end nuts 34a and 34b are interchangeably coupled to the axle ends of the hub axle 20. In particular, the left first end nut 32a and the left second end nut 34a are interchangeably and threadedly coupled to the male screw section 46 of the hub axle 20 at the left end of the hub axle 20, while the right first end nut 32b and the right second end nut 34b are interchangeably and threadedly coupled to the male screw section 52 of the hub axle 20 at the right end of the hub axle 20. The left and right first end nuts 32a and 32b and the left and right second end nuts 34a and 34b are basically has a generally tubular shape, and are, for example, made of metallic material, such as aluminum alloy. The left and right first end nuts 32a and 32b are concentrically arranged relative to the center axis of the hub axle 20 when the left and right first end nuts 32a and 32b are coupled to the hub axle 20. The left and right second end nuts 34a and 34b are concentrically arranged relative to the center axis of the hub axle 20 when the left and right second end nuts 34a and 34b are coupled to the hub axle 20.

As best shown in FIG. 6, the left first end nut 32a has an inner peripheral surface 66a with a left handed female or internal screw section 66b. The left first end nut 32a has a constant outer diameter D21 along an axial direction of the left first end nut 32a. The inner peripheral surface 66a has an inner diameter D22 that is substantially equal to the inner diameter D11 of the hub axle 20. The inner peripheral surface 66a forms a first through hole of the first end nut. The female screw section 66b of the left first end nut 32a is configured to be threadedly coupled to the male screw section 46 of the hub axle 20. In particular, the left first end nut 32a is threadedly tightened to the hub axle 20 until a step part of the inner peripheral surface 66a contacts with an left axial end of the hub axle 20 or until an axial end of the left first end nut 32a contacts with an axial end of the left inner ring 62a of the left bearing 24a.

Furthermore, as best shown in FIG. 6, the right first end nut 32b has an inner peripheral surface 68a with a right handed female or internal screw section 68b. The inner peripheral surface 68a has an inner diameter D23 that is substantially equal to the inner diameter D11 of the hub axle 20 and the inner diameter D22 of the inner peripheral surface 66a of the left first end nut 32a. The inner peripheral surface 68a forms a first through hole of the first end nut. The female screw section 68b of the right first end nut 32b is configured to be threadedly coupled to the male screw section 52 of the hub axle 20. The right first end nut 32b is threadedly tightened to the hub axle 20 until a step part of the inner peripheral surface 68a contacts with an right axial end of the hub axle 20. The axial dimension of the female screw section 68b is smaller than the axial dimension of the male screw section 52 of the hub axle 20 to form an axial gap in which the retaining member 28 is disposed while the female screw section 68b is threaded to the male screw section 52. Furthermore, the right first end nut 32b has a flange section 68c at an axial end of the right first end nut 32b. The flange section 68c of the right first end nut 32b has an annular axially facing surface 68d. The intermediate member 30 is sandwiched in the loaded state between the axial outward face of the retaining member 28 and the axially facing surface 68d of the right first end nut 32b while the right first end nut 32b is utilized in the bicycle hub assembly 12 and fully fastened to the hub axle 20.

On the other hand, as best shown in FIG. 7, the left second end nut 34a has a large diameter portion 70a and a small diameter portion 70b that are axially and concentrically arranged relative to each other. The large diameter portion 70a has a constant outer diameter D31 along an axial direction of the left second end nut 34a, and is larger than the small diameter portion 70b in outer diameter. The outer diameter D31 of the left second end nut 34a is substantially equal to the outer diameter D21 of the left first end nut 32a. The large diameter portion 70a has a left handed female or internal screw section 70c on an inner peripheral surface. The female screw section 70c of the left second end nut 34a is configured to be threadedly coupled to the male screw section 46 of the hub axle 20. In particular, the left second end nut 34a is threadedly tightened to the hub axle 20 until an axial end face radially extending between the large diameter portion 70a and the small diameter portion 70b contacts with the left axial end of the hub axle 20 or until the axial end of the left second end nut 34a contacts with the axial end of the left inner ring 62a of the left bearing 24a. The small diameter portion 70b axially protrudes relative to the large diameter portion 70a to form a bicycle fork attachment section that is attached to the bicycle fork of the bicycle frame 14. The small diameter portion 70b has an inner peripheral surface 70d. The inner peripheral surface 70d of the small diameter portion 70b has an inner diameter D32 that is smaller than the inner diameter D22 of the left first end nut 32a. The inner peripheral surface 70d forms a second through hole of the second end nut. Furthermore, the inner diameter D32 of the small diameter portion 70b is substantially equal to the outer diameter D13 of the second spindle 38 (see FIG. 2). Optionally, the small diameter portion 70b can have an outer diameter that is equal to the outer diameter D12 of the first spindle 36.

Furthermore, as best shown in FIG. 7, the right second end nut 34b has a large diameter portion 72a and a small diameter portion 72b that are axially and concentrically arranged relative to each other. The large diameter portion 72a is larger than the small diameter portion 72b in outer diameter. The large diameter portion 70a has a right handed female or internal screw section 72c on an inner peripheral surface. The female screw section 72c of the right second end nut 34b1 is configured to be threadedly coupled to the male screw section 52 of the hub axle 20. In particular, the right second end nut 34b is threadedly tightened to the hub axle 20 until an axial end face radially extending between the large diameter portion 72a and the small diameter portion 72b contacts with the right axial end of the hub axle 20. The small diameter portion 72b axially protrudes relative to the large diameter portion 72a to form a bicycle fork attachment section that is attached to the bicycle fork of the bicycle frame 14. The small diameter portion 72b has an inner peripheral surface 72d. The inner peripheral surface 72d of the small diameter portion 72b has an inner diameter D33 that is smaller than the inner diameter D23 of the right first end nut 32b. The inner peripheral surface 72d forms a second through hole of the second end nut. Furthermore, the inner diameter D33 of the small diameter portion 72b is substantially equal to the outer diameter D13 of the second spindle 38 (see FIG. 2) and the inner diameter D32 of the small diameter portion 70b of the left second end nut 34a. Optionally, the small diameter portion 72b can have an outer diameter that is equal to an outer diameter of a threaded section 36b of the first spindle 36 (see FIG. 2). Furthermore, the right second end nut 34b has a flange section 72e at an axial end of the large diameter portion 72a. The flange section 72*e* of the right second end nut 34*b* has an annular axially facing surface 72*f*. The intermediate member 30 is sandwiched in the loaded state between the axial outward face of the retaining member 28 and the axially facing surface 72*f* of the right second end nut 34*b* while the right second end nut 34*b* is utilized in the bicycle hub assembly 12 and fully fastened to the hub axle 20.

As shown in FIG. 2, the first and second spindles 36 and 38 are interchangeably utilized in the bicycle hub assembly 12. In particular, the first spindle 36 is coupled to the bicycle hub assembly 12 while the left and right first end nuts 32*a* and 32*b* are utilized in the bicycle hub assembly 12 to form the so-called thru axle hub, while the second spindle 38 is coupled to the bicycle hub assembly 12 while the left and right second end nuts 34*a* and 34*b* are utilized in the bicycle hub assembly 12 to form the so-called quick release hub. In other words, the first and second spindles 36 and 38 are interchangeably coupled to the left and right first end nuts 32*a* and 32*b* and the left and right second end nuts 34*a* and 34*b*, respectively.

Specifically, the first spindle 36 is utilized with the hub assembly 12 shown in FIG. 3, in which the left and right first end nuts 32*a* and 32*b* are utilized. In particular, the first spindle 36 extends through the left and right first end nuts 32*a* and 32*b* and the hub axle 20 of the bicycle hub assembly 12 for attaching the bicycle hub assembly 12 to the bicycle fork of the bicycle frame 14. As shown in FIG. 2, the first spindle 36 has an axle shaft 36*a* with a threaded section 36*b* at one end, and a cam lever 36*c* at the other end. The axle shaft 36*a* of the first spindle 36 has a larger stiffness than the standard quick release system since the axle shaft 36*a* of the first spindle 36 has a larger diameter than that of the quick release system. For example, in the illustrated embodiment, the outer diameter D12 of the axle shaft 36*a* is 15 mm. However, the outer diameter D12 of the axle shaft 36*a* can be a different dimension, such as 12 mm, 20 mm and the like. The outer diameter D12 of the first spindle 36 is larger than the inner diameters D32 and D33 of the left and right second end nuts 34*a* and 34*b*. Since the constructions of the first spindle 36 are conventional, detailed description of the first spindle 36 is omitted for the sake of brevity. The threaded section 36*b* of the first spindle 36 is threadedly coupled to a threaded hole of the bicycle fork of the bicycle frame 14 in a conventional manner for coupling the first spindle 36 and the bicycle hub assembly 12 to the bicycle frame 14.

On the other hand, the second spindle 38 is utilized with the hub assembly 12 shown in FIG. 4, in which the left and right second end nuts 34*a* and 34*b* are utilized. In particular, the second spindle 38 extends through the left and right second end nuts 34*a* and 34*b* and the hub axle 20 of the bicycle hub assembly 12 for attaching the bicycle hub assembly 12 to the bicycle fork of the bicycle frame 14. As shown in FIG. 2, the second spindle 38 has a quick hub rod 38*a* with a threaded section 38*b* at one end, and a cam lever 38*c* at the other end. The outer diameter D13 of the quick hub rod 38*a* of the second spindle 38 is smaller than the outer diameter D12 of the axle shaft 36*a* of the first spindle 36. For example, in the illustrated embodiment, the outer diameter D13 of the quick hub rod 38*a* is 9 mm. However, the outer diameter D13 of the quick hub rod 38*a* can be a different dimension. The outer diameter D13 of the second spindle 38 is smaller than the inner diameters D22 and D23 of the left and right first end nuts 32*a* and 32*b*. Since the constructions of the second spindle 38 are conventional, detailed description of the second spindle 38 is omitted for the sake of brevity. The threaded section 38*b* of the second spindle 38 is threadedly coupled to the adjusting nut 40 in a conventional manner for coupling the second spindle 38 and the bicycle hub assembly 12 to the bicycle fork of the bicycle frame 14.

With the bicycle hub kit 16, the bicycle hub assembly 12 can be converted from the thru axle hub to the quick release hub by merely replacing the left and right first end nuts 32*a* and 32*b* with the left and right second end nuts 34*a* and 34*b*, respectively, and vice versa. Thus, a conventional hub axle adapter does not need to be installed in the bicycle hub assembly 12 for converting the bicycle hub assembly 12 from the thru axle hub to the quick release hub. Therefore, different spindles 36 and 38 can be interchangeably accommodated in the bicycle hub assembly 12 without increasing the weight of the bicycle hub assembly 12.

Referring now to FIGS. 3, 4, 6 and 7, the conversion of the bicycle hub assembly 12 from the thru axle hub as shown in FIG. 3 to the quick release hub as shown in FIG. 4 will be further explained. First, the right first end nut 32*b* is loosened and removed from the male screw section 52 of the hub axle 20 by rotating the right first end nut 32*b* relative to the hub axle 20 (see FIG. 3). The retaining member 28 and the intermediate member 30 are also removed by sliding the retaining member 28 and the intermediate member 30 along the chamfered sections 54 of the hub axle 20. Furthermore, the right inner ring 62*b* of the right bearing 24*b* is loosened and removed from the male screw section 50 of the hub axle 20 by rotating the right inner ring 62*b* relative to the hub axle 20. The hub axle 20 is removed from the hub body 22 by pulling the hub axle 20 out of the hub body 22. In the illustrated embodiment, as shown in FIG. 6, the left first end nut 32*a* and the left inner ring 62*a* of the left bearing 24*a* are also removed with the hub axle 20 from the hub body 22. Then, the left first end nut 32*a* is loosened and removed from the male screw section 46 of the hub axle 20 by rotating the left first end nut 32*a* relative to the hub axle 20, and is replaced with the left second end nut 34*a*. In particular, as shown in FIG. 7, the left second end nut 34*a* is fastened to the male screw section 46 of the hub axle 20 by rotating the left second end nut 34*a* relative to the hub axle 20. Then, the hub axle 20 is inserted back into the hub body 22 as shown in FIG. 4. The right inner ring 62*b* of the right bearing 24*b* is fastened to the male screw section 50 of the hub axle 20 by rotating the right inner ring 62*b* relative to the hub axle 20. Furthermore, the retaining member 28 and the intermediate member 30 are also installed in position by sliding the retaining member 28 and the intermediate member 30 along the chamfered sections 54 of the hub axle 20. Then, the right second end nut 34*b* is fastened to the male screw section 52 of the hub axle 20 by rotating the right second end nut 34*b* relative to the hub axle 20. The conversion of the bicycle hub assembly 12 from the quick release hub as shown in FIG. 4 to the thru axle hub as shown in FIG. 3 can also be accomplished in a similar manner. Thus, detailed descriptions thereof are omitted for the sake of brevity.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts.

While only a preferred embodiment has been chosen to illustrate the present invention, it will be apparent to those skilled in the art from this disclosure that various changes and modifications can be made herein without departing from the scope of the invention as defined in the appended claims. Furthermore, the foregoing descriptions of the preferred embodiment according to the present invention are provided for illustration only, and not for the purpose of limiting the invention as defined by the appended claims and their equivalents.

What is claimed is:

1. A bicycle hub kit comprising:
   a hub axle;
   a hub shell rotatably supported to the hub axle;
   a bearing unit rotatably supporting the hub shell relative to the hub axle, the bearing unit having a first ring that is coupled to the hub axle, a second ring that is coupled to the hub shell, and a plurality of rollers that is disposed between the first and second rings;
   a retaining member coupled to the first ring of the bearing unit and retaining an axial position of the first ring of the bearing unit with respect to the hub axle, the retaining member being disposed between the first ring of the bearing unit and a first end nut or a second end nut; and
   the first end nut having a first through hole and the second end nut having a second through hole, the first through hole having a first inner diameter for receiving a first spindle having a first spindle diameter, the second through hole having a second inner diameter for receiving a second spindle having a second spindle diameter, the second inner diameter of the second through hole being smaller than the first inner diameter of the first through hole, the second spindle diameter being smaller than the first spindle diameter,
   the first and second end nuts being configured and arranged to be interchangeably coupled to an axle end of the hub axle to accommodate one of the first and the second spindles.

2. The bicycle hub kit according to claim 1, wherein the first and second end nuts are threadedly coupled to a threaded section of the hub axle.

3. The bicycle hub kit according to claim 2, wherein the first ring of the bearing unit is axially adjustably coupled to the threaded section of the hub axle.

4. The bicycle hub kit according to claim 3, wherein the hub axle has a retaining member attachment section, and
   the retaining member is non-rotatably mounted to the retaining member attachment section of the hub axle.

5. The bicycle hub kit according to claim 1, further comprising
   an intermediate member disposed between the retaining member and one of the first and second end nuts.

6. The bicycle hub kit according to claim 1, wherein the first and second spindles are configured and arranged to be interchangeably coupled to the first and second end nuts.

7. The bicycle hub kit according to claim 6, wherein the first spindle diameter of the first spindle is larger than the second inner diameter of the second end nut.

8. The bicycle hub kit according to claim 6, wherein the second spindle diameter of the second spindle is smaller than the first inner diameter of the first end nut.

* * * * *